(12) United States Patent
Han (10) Patent No.: US 9,991,567 B2
(45) Date of Patent: Jun. 5, 2018

(54) BATTERY PACK

(71) Applicant: Samsung SDI Co., Ltd., Yongin-si, Gyeonggi-do (KR)

(72) Inventor: Jongchan Han, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 172 days.

(21) Appl. No.: 14/960,040

(22) Filed: Dec. 4, 2015

(65) Prior Publication Data

US 2016/0308255 A1 Oct. 20, 2016

(30) Foreign Application Priority Data

Apr. 17, 2015 (KR) ........................ 10-2015-0054403

(51) Int. Cl.
| | |
|---|---|
| *H01M 2/30* | (2006.01) |
| *H01M 2/02* | (2006.01) |
| *H01M 2/34* | (2006.01) |
| *H01M 10/42* | (2006.01) |
| *H01M 2/10* | (2006.01) |
| *H01M 2/20* | (2006.01) |

(52) U.S. Cl.
CPC ....... *H01M 10/425* (2013.01); *H01M 2/0217* (2013.01); *H01M 2/1061* (2013.01); *H01M 2/204* (2013.01); *H01M 2/30* (2013.01); *H01M 2/34* (2013.01); *H01M 2200/00* (2013.01)

(58) Field of Classification Search
CPC .............. H01M 2/0217; H01M 10/425; H05K 1/0278; H05K 1/0281; H05K 3/4691
See application file for complete search history.

(56) References Cited

U.S. PATENT DOCUMENTS

| | | | | | |
|---|---|---|---|---|---|
| 5,582,931 | A | * | 12/1996 | Kawakami | ............. H01M 6/40 429/127 |
| 5,637,418 | A | * | 6/1997 | Brown | ................ H01M 2/0207 429/127 |
| 6,225,778 | B1 | * | 5/2001 | Hayama | .............. H01M 2/1061 320/112 |
| 6,773,848 | B1 | * | 8/2004 | Nortoft | ............... H01M 2/1066 361/776 |
| 7,033,701 | B2 | * | 4/2006 | Hong | ...................... H01M 2/18 429/129 |
| 9,178,203 | B2 | * | 11/2015 | Lev | ........................ H01M 2/202 |
| 2005/0189139 | A1 | * | 9/2005 | Stole | ................... H01M 2/0275 174/260 |
| 2008/0176131 | A1 | * | 7/2008 | Byun | ................... H01M 2/0215 429/122 |
| 2009/0154048 | A1 | * | 6/2009 | Jang | ........................ H01M 2/30 361/106 |

(Continued)

FOREIGN PATENT DOCUMENTS

| | | |
|---|---|---|
| JP | 2001-266817 A | 9/2001 |
| JP | 2005-123128 A | 5/2005 |
| KR | 10-2014-0038037 A | 3/2014 |

*Primary Examiner* — Matthew J Merkling
(74) *Attorney, Agent, or Firm* — Lewis Roca Rothgerber Christie LLP (57) ABSTRACT

A battery pack includes a plurality of stacked unit batteries and a circuit board electrically coupled to the plurality of stacked unit batteries and being bent. The circuit board includes a first substrate including a bending portion and a second substrate on the first substrate layer and being less flexible than the first substrate layer.

17 Claims, 7 Drawing Sheets

(56) References Cited

U.S. PATENT DOCUMENTS

| | | | |
|---|---|---|---|
| 2015/0044511 A1* | 2/2015 | Kim | H01M 10/425 |
| | | | 429/7 |
| 2015/0194697 A1* | 7/2015 | Hung | H01M 10/0436 |
| | | | 429/158 |
| 2015/0228937 A1* | 8/2015 | Spilker | H01M 2/1022 |
| | | | 429/159 |

* cited by examiner

BATTERY PACK

CROSS-REFERENCE TO RELATED APPLICATION

This application claims priority to and the benefit of Korean Patent Application No. 10-2015-0054403, filed on Apr. 17, 2015 in the Korean Intellectual Property Office, the entire content of which is incorporated herein by reference.

BACKGROUND

1. Field

Aspects of embodiments of the present invention relate to a battery pack.

2. Description of the Related Art

Generally, a secondary battery is a battery designed to be charged and discharged multiple times. The secondary battery can be charged by not only the conventional power grid, such as the power grid supplied by power plants, but also by solar energy and other new renewable energy sources. The secondary battery is used as an energy source for electronic devices, such as mobile phones, laptop computers, and camcorders, and automobiles and large facilities which require a power supply.

Depending on an intended use (e.g., an anticipated energy requirement), a plurality of unit batteries may be coupled in series and/or in parallel in order to implement a high output or high capacity secondary battery. In addition, as desired, the secondary battery may further include a controller for controlling charge and/or discharge and/or for preventing overcharge and/or overdischarge of the secondary battery.

SUMMARY

Aspects of embodiments of the present invention relate to a compact battery pack.

Aspects of embodiments of the present invention relate to a battery pack having a simple coupling structure between a plurality of unit batteries and a circuit board.

Embodiments of the present invention may be realized by a battery pack including a plurality of unit batteries stacked on each other and a circuit board electrically coupled to the plurality of unit batteries and being bent. The circuit board includes a first substrate including a bending portion and a second substrate on the first substrate and being less flexible than the first substrate.

In an embodiment, the battery pack may further include a plurality of circuit devices on the circuit board and electrically coupled to the plurality of unit batteries.

In an embodiment, at least one of the plurality of circuit devices may be configured to prevent overcharge or overdischarge of the plurality of unit batteries.

In an embodiment, the plurality of circuit devices may be on a surface of the first substrate opposite to a surface on which the second substrate is arranged.

In an embodiment, the battery pack may further include a plurality of coupling terminals on the first substrate and electrically coupled to the plurality of unit batteries. The plurality of coupling terminals may be on a surface of the first substrate opposite to a surface on which the second substrate is arranged.

In an embodiment, each of the plurality of unit batteries may include a case, a cathode tab, and an anode tab. The cathode tab may extend to outside of the case and may be coupled to one of the plurality of coupling terminals, and the anode tab may extend to the outside of the case and may be coupled to another one of the plurality of coupling terminals.

In an embodiment, grooves may be at overlapping portions of the first substrate and the second substrate where the plurality of coupling terminals are arranged such that the plurality of coupling terminals are exposed through the second substrate.

In an embodiment, each of the plurality of unit batteries may include a case, an anode tab, and a cathode tab, the anode tab and the cathode tab both extending to outside of the case and coupled to the circuit board. The second substrate may have a length that is greater than a distance between the anode tab and the cathode tab of one of the plurality of unit batteries and less than or the same as a sum of widths of the plurality of unit batteries.

In an embodiment, the second substrate may extend in a direction crossing a direction in which the anode tab and the cathode tab extend.

In an embodiment, the bending portion may include a portion that has a width that is less than an adjacent portion of the bending portion.

In an embodiment, the plurality of unit batteries may include first and second unit batteries and each of the first and second unit batteries may include an anode tab and a cathode tab. The first substrate may include first and second flat portions respectively extending from ends of the bending portion and overlapping each other.

In an embodiment, the second substrate may include a first rigid base on the first flat portion and a second rigid base on the second flat portion.

The first rigid base may extend in a same direction as that of the first flat portion. The second rigid base may extend in a same direction as that of the second flat portion.

In an embodiment, the first rigid base may have a length that is greater than a distance between the anode tab and the cathode tab of the first unit battery and less than or the same as a width of the first unit battery. The second rigid base may have a length greater than a distance between the anode tab and the cathode tab of the second unit battery and less than or the same as a width of the second unit battery.

In an embodiment, the first rigid base and the second rigid base may be separate from each other.

In an embodiment, by stacking unit batteries, a compact battery pack may be implemented.

In an embodiment, because each electrode tab of unit battery is directly coupled to the circuit board, the coupling structure may be relatively simple.

BRIEF DESCRIPTION OF THE DRAWINGS

Example embodiments of the present invention will now be described more fully hereinafter with reference to the accompanying drawings; however, the present invention may be embodied in different forms and should not be construed as limited to the embodiments set forth herein. Rather, these embodiments are provided so that this disclosure will be thorough and complete and will fully convey the scope of the present invention to those skilled in the art.

In the figures, dimensions may be exaggerated for clarity of illustration. It will be understood that when an element is referred to as being "between" two elements, it can be the only element between the two elements or one or more intervening elements may also be present. Like reference numerals refer to like elements throughout.

DETAILED DESCRIPTION

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, it will be understood that when an element or layer is referred to as being "on", "connected to," or "coupled to" another element or layer, it can be directly on, connected, or coupled to the other element or layer or intervening elements or layers may be present. When an element is referred to as being "directly on," "directly connected to," or "directly coupled to" another element or layer, there are no intervening elements or layers present. Like numbers refer to like elements throughout. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration.

It will be understood that, although the terms first, second, etc. may be used herein to describe various elements, components, regions, layers, and/or sections, these elements, components, regions, layers, and/or sections should not be limited by these terms. These terms are only used to distinguish one element, component, region, layer, or section from another region, layer, or section. Thus, a first element, component, region, layer, or section discussed below could be termed a second element, component, region, layer, or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein should be interpreted accordingly.

The terminology used herein is for the purpose of describing particular embodiments only and is not intended to be limiting of the invention. As used herein, the singular forms, "a" and "an" are intended to include the plural forms as well, unless the context clearly indicates otherwise. It will be further understood that the terms "includes", "including", "comprises", and/or "comprising", when used in this specification, specify the presence of stated features, integers, steps, operations, elements, and/or components but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The circuit devices and/or any other relevant devices or components according to embodiments of the present invention described herein may be implemented utilizing any suitable hardware, firmware (e.g. an application-specific integrated circuit), software, and/or a suitable combination of software, firmware, and hardware. For example, the various components of the circuit devices may be formed on one integrated circuit (IC) chip or on separate IC chips. Further, the various components of the circuit devices may be implemented on a flexible printed circuit film, a tape carrier package (TCP), a printed circuit board (PCB), or formed on a same substrate as the circuit devices. Further, the various components of the circuit devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the exemplary embodiments of the present invention.

Figure 1:
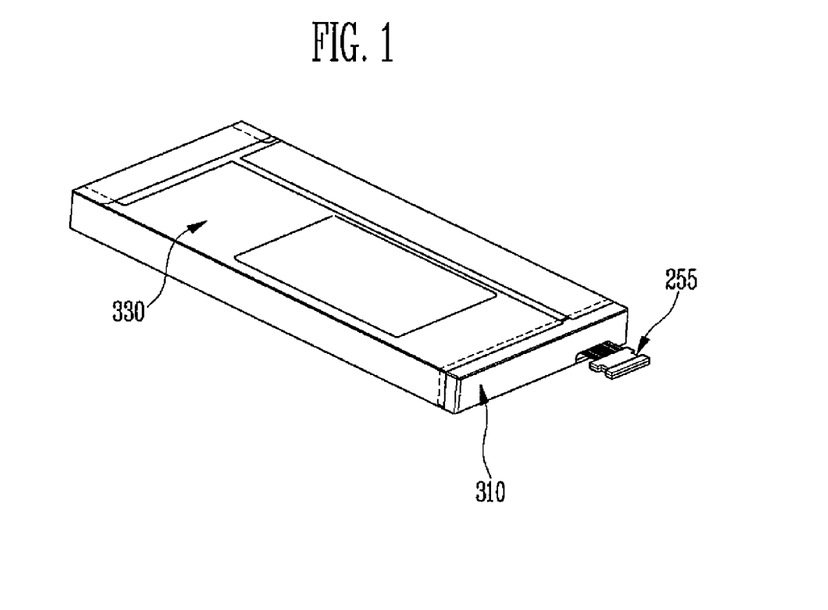
FIG. 1 is a perspective view of an embodiment of the present invention.
Figure 2:
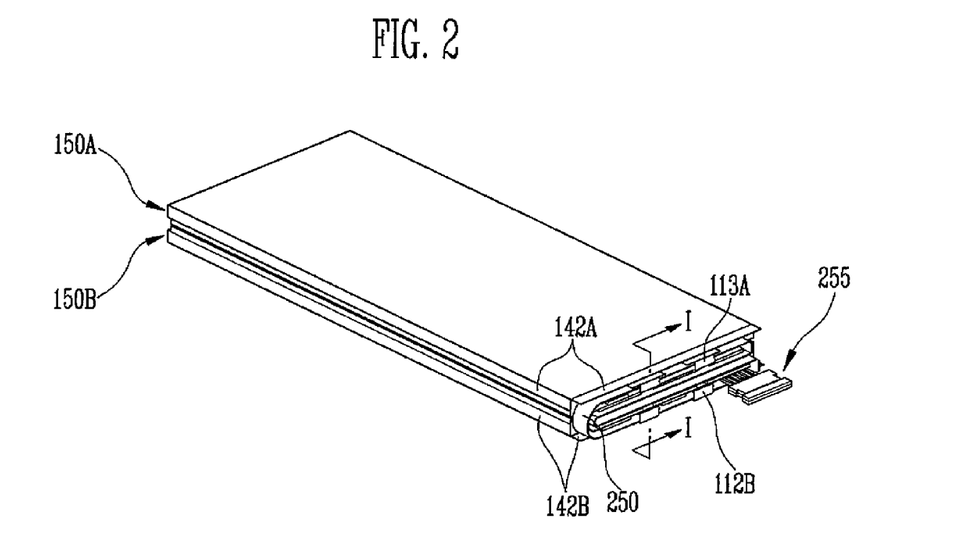
FIG. 2 is a perspective view illustrating a label but without a front side insulating tape compared to the embodiment illustrated in FIG. 1.
Figure 3:
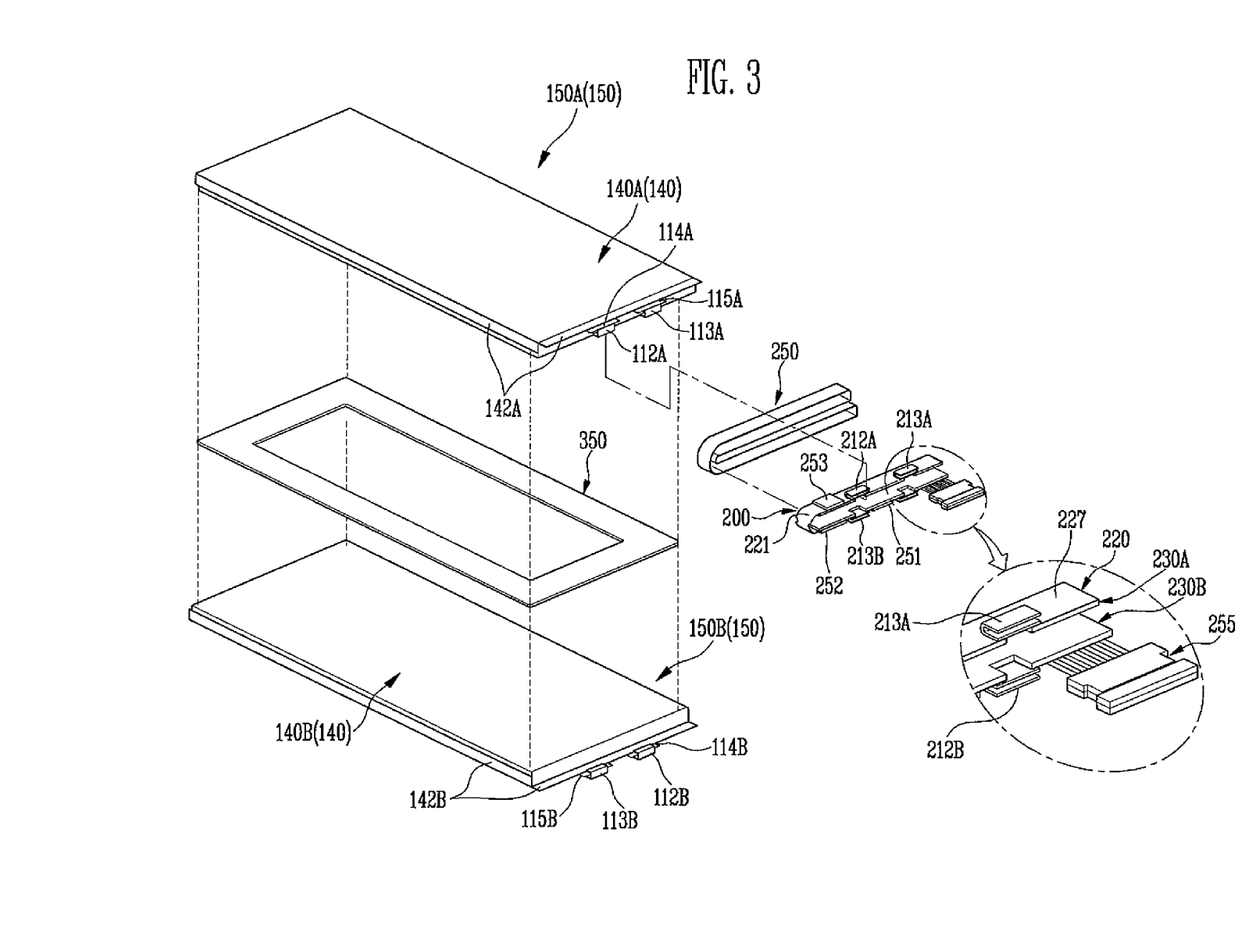
FIG. 3 is an exploded perspective view of the embodiment illustrated in FIG. 2.
Figure 4:
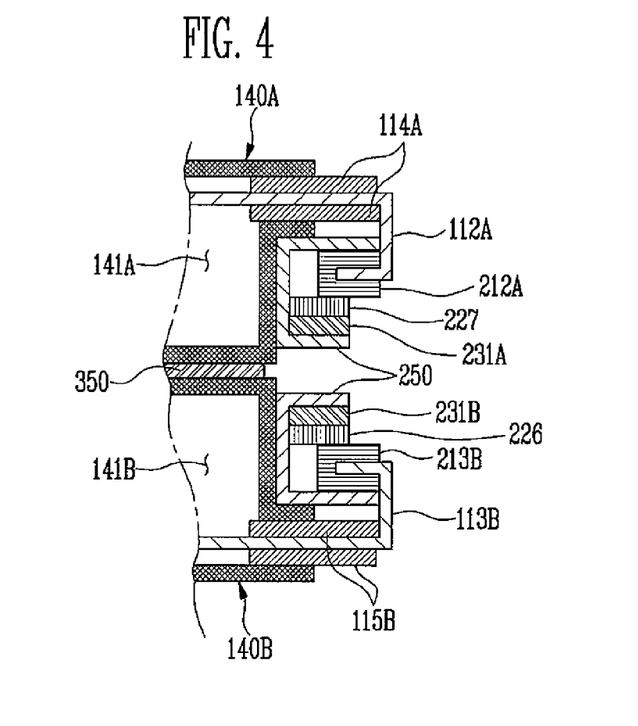
FIG. 4 is a cross sectional view taken along the line I-I of FIG. 2.

FIG. 1 is a perspective view illustrating an exterior of a secondary battery according to an embodiment of the present invention. FIG. 2 is a perspective view illustrating the second battery illustrated in FIG. 1 without a front side label. FIG. 3 is an exploded perspective view of the embodiment illustrated in FIG. 2. FIG. 4 is a cross sectional view taken along the line I-I of FIG. 2.

A battery pack according to an embodiment of the present invention may include at least two unit batteries 150 (e.g., a plurality of unit batteries), a circuit board, a plurality of insulating members 250 and 310, and a label 330.

The at least two unit batteries 150 may include a first unit battery 150A and a second unit battery 150B. The first unit battery 150A and the second unit battery 150B may overlap each other (e.g., may be in a stacked arrangement). In an embodiment, a pair of unit batteries are provided; however, the number of unit batteries should not be limited thereto. More than two unit batteries may be included in a battery pack to obtain a desired capacity or output.

The unit battery may be a secondary battery, capable of being repeatedly charged and discharged. The unit battery may include an electrode assembly having a separator interposed between an anode and a cathode and sealed in a battery case along with an electrolyte. The electrode assembly may include the anode, the separator, and the cathode. The anode, the separator, and the cathode may be stacked (the "stack type"). The anode, the separator, and the cathode may be wrapped (the "wrapped type"). The first unit battery 150A and the second unit battery 150B may be the same as each other in shape and constitution. Details as to inner structure of the unit batteries will be further described with reference to FIGS. 5 and 6.

Referring to FIG. 3, a first unit battery 150A and a second unit battery 150B may be stacked. The first unit battery 150A and the second unit battery 150B may be arranged such that a case surface of the first unit battery 150A and a case surface of the second unit battery 150B may face each other. A sealing portion 142A may be provided at an edge on a surface of a case 140A of the first unit battery. A sealing portion 142B may be provided at an edge on a surface of a case 140B of the second unit battery. The first unit battery and the second unit battery may be stacked such that a surface opposite to the surface where the sealing portions 142A and 142B of each unit battery face each other.

In another embodiment, when an additional unit battery is stacked, for example, but without limitation thereto, a third unit battery is further included, the third unit battery may be stacked such that a surface of the case where the sealing portion is formed faces a surface of the case where the sealing portion of the second unit battery is formed. In yet another embodiment, when the third unit battery and a fourth unit battery are further included, the first to fourth unit batteries may all be stacked, the first and second unit batteries being stacked as described above, the third unit battery being stacked such that the surface of the case where the sealing portion is formed faces the surface of the case where the sealing portion of the second unit battery is formed. And the fourth unit battery may be stacked such that the opposite surface of the case surface where the sealing portion is formed is stacked on the opposite surface of the case surface where the sealing portion of the third unit battery is formed. Additional unit batteries may be stacked as such.

In each of the first unit battery 150A and the second unit battery 150B, an anode tab and a cathode tab may be exposed to outside of the case. An anode tab 112A and a cathode tab 113A of the first unit battery may extend to outside through the sealing portion 142A of the first unit battery. An anode tab 112B and a cathode tab 113B of the second unit battery may extend to outside through the sealing portion 142B of the second battery unit.

The anode tabs 112A and 112B and the cathode tabs 113A and 113B may be inserted into coupling terminals 212A, 212B, 213A and 213B, respectively. An end portion of the anode tabs and an end portion of the cathode tabs may bend (e.g., may be bent) almost 180 degrees (e.g., about 180 degrees), respectively, and may be fixed to the coupling terminals. The coupling relationship between the anode tabs and the cathode tabs and the coupling terminals will be further described below.

An adhesive layer 350 may be provided between the first unit battery and the second unit battery. The adhesive layer 350 may fix the first unit battery and the second unit battery to each other. The adhesive layer 350 may be an adhesive tape in a quadrilateral edge form. A size of the edges of the adhesive layer 350 may be the same as or smaller than a size of a surface of the first unit battery and/or the second unit battery.

In another embodiment, the first unit battery and the second unit battery may not be held together (e.g., joined) by the adhesive layer but by something else. For example, but without limitation thereto, a case 140A of the first unit battery and a case 140B of the second unit battery may be coupled and fixed by a hook.

A circuit board may be electrically coupled to one or both of the unit batteries. The circuit board may include a flexible substrate layer 220 (e.g., a flexible substrate) and rigid substrate layers 230A and 230B (e.g., rigid substrates). The flexible substrate layer and the rigid substrate layers may be made of an insulating material. The rigid substrate layer may be harder than the flexible substrate layer (e.g., the rigid substrate layer may be less flexible than the flexible substrate layer). Therefore, relatively, the flexible substrate layer may bend more easily than the rigid substrate layer.

The flexible substrate layer and the rigid substrate layers may be plates having a width (e.g., a preset width) and may extend in a direction which crosses an extension direction of the anode tab and the cathode tab of the unit battery. Because the anode tab and the cathode tab of the unit battery extend in a length direction of the unit battery, the flexible substrate layer and the rigid substrate layer may substantially extend in a width direction of the case of the unit battery. The circuit board may be provided between the sealing portion 142A of the first unit battery and the sealing portion 142B of the second unit battery from a side where the anode tabs and the cathode tabs of the unit batteries are exposed. The circuit board may be at least partially surrounded by the sealing portion 142A of the first unit battery and the sealing portion 142B of the second unit battery.

A conductive wire may be formed at the flexible substrate layer 220, and the unit battery may be electrically coupled to the circuit board by the conductive wire. The flexible substrate layer where the conductive wire is formed may be a flexible printed circuit board. The first unit battery and the second unit battery may be coupled to each other in series or in parallel. As the first unit battery and the second unit battery are electrically coupled to the circuit board, the first unit battery and the second unit battery may be electrically coupled to each other.

In an embodiment, the unit batteries are electrically coupled to the flexible substrate layer. In an embodiment, the flexible substrate layer may further include the plurality of coupling terminals 212A, 212B, 213A, and 213B. The coupling terminals may each be a conductive plate member bent in a generally U-shape. A width of each of the coupling terminals may be at least the same as or greater than a width of the anode tab or the cathode tab of the unit batteries.

As one of the coupling terminals is bent, an end portion of the corresponding anode tab or cathode tab of the unit battery may be inserted and fixed at a space formed inside. In an embodiment, in order to more firmly fix the anode tab inserted in the coupling terminal or the cathode tab inserted in the coupling terminal, a welding portion or a soldering portion may be further formed. The welding portion may be formed by laser welding and the like.

The plurality of coupling terminals may include a first anode coupling terminal 212A, a first cathode coupling terminal 213A, a second anode coupling terminal 212B, and a second cathode coupling terminal 213B. The first anode coupling terminal 212A may fix the anode tab 112A of the first unit battery to the circuit board. The first cathode coupling terminal 213A may fix the cathode tab 113A of the first unit battery to the circuit board. Similarly, the second anode coupling terminal 212B may fix the anode tab 1126 of the second unit battery to the circuit board. The second cathode coupling terminal 213B may fix the cathode tab 113B of the second unit battery to the circuit board.

In an embodiment, the coupling terminals are plates that are bent almost (e.g., about) 180 degrees. However, the shape of the plurality of coupling terminals should not be limited thereto. For example, but without being limited thereto, the coupling terminals may be formed as flat plates, may be formed in cap-shapes with an open side, or may be formed in a variety of shapes suitable for electrically coupling the electrode tab of the battery to the circuit board, such as other known coupling terminals.

In an embodiment, the unit batteries are electrically coupled to the circuit board through the coupling terminals. However, the present invention should not be limited thereto. In another embodiment, the anode tab and the cathode tab of the unit battery may be coupled to the conductive wire of the circuit board by soldering (e.g., with solder) and the like without being directly coupled to the coupling terminal.

The plurality of coupling terminals may be fixed to the flexible substrate layer and be electrically coupled to the conductive wire. Hereinafter, for convenience of illustration, a surface of the flexible substrate layer at which the coupling terminals are fixed to the flexible substrate layer may be called a terminal installation surface or a device installation surface.

In an embodiment, a plurality of circuit devices, mounted on the flexible substrate layer, may be further included to implement a circuit that performs (e.g., provides) control function. Referring to FIG. 3, a plurality of circuit devices 251, 252, and 253 may be mounted on the device installation surface of the flexible substrate and may be arranged in a space remaining after the plurality of coupling terminals 212A, 212B, 213A, and 213B are disposed thereon. The plurality of circuit devices may be electrically coupled by the conductive wire of the flexible substrate layer to form the circuit. The plurality of circuit devices may perform control functions by being electrically coupled to the first and second unit batteries through the conductive wire formed on the flexible substrate layer.

The control functions may include control relating to management of the unit batteries, such as charge control, discharge control, overcharge prevention control, overdischarge prevention control, other safety related control, sensor control, communication control with outside, and/or the like. The sensor may include a temperature sensor, a voltage sensor, a current sensor, and the like. The temperature sensor may collect data for safety control by the sensor, such as measuring the temperature of the battery.

In an embodiment, at least one device from among the plurality of circuit devices 251, 252, and 253 of the circuit that performs the control function may form a protective circuit of the unit battery. The protective circuit is a circuit capable of protecting the unit batteries by controlling charge and discharge thereof as well as blocking overcharge, overdischarge, short circuit, reverse voltage, and the like by controlling voltage or current to and/or from the unit batteries.

For example, but without limitation thereto, in order to form the protective circuit, the plurality of circuit devices 251, 252, and 253 may include a field effect transistor, an integrated circuit, a positive temperature coefficient, a switching device, and/or the like, which may control charge and discharge and may block or cut off a circuit.

A connector 255 for electrically coupling the battery pack to outside (e.g., to an external device) may be further included on or coupled to the flexible substrate layer. Power may be supplied from the battery pack to an external device through the connector. The circuit that performs the control function may be operated and/or the unit battery 150 may be charged as the power is supplied to the battery pack from outside through the connector. The circuit may of course be operated as it receives power supplied from the unit battery 150.

The circuit board 220, 230A, and 230B, the plurality of circuit devices 251, 252, and 253, the connector 255, and the plurality of coupling terminals 212A, 212B, 213A, and 213B may be arranged or connected together to provide a control module 200 (e.g., a controller). The control module 200 may be a module for performing control relating to management of the unit batteries. The control circuit is the same or substantially the same as what is described above. In another embodiment, the control module may be provided without including the coupling terminals.

Referring to FIG. 3, the flexible substrate layer will be further described. The flexible substrate layer 220 may be a substrate having a plate shape extending in a width direction of the unit battery and bending once. The number of times the flexible substrate layer is bent may vary as the number of the unit batteries increases. For example, but without limitation thereto, when the first to third unit batteries are included, the flexible substrate layer may bend twice, and in another embodiment, when the first to fourth unit batteries are included, the flexible substrate layer may bend three times.

Hereinafter, the portion at which the flexible substrate layer 220 is bent is called a bending portion 221. The bending portion 221 may have a U-shaped curve as the substrate is bent almost (e.g., about) 180 degrees. However, the bending portion 221 does not always have to be formed as a curved shape, and it may be bent 180 degrees with one or two angular edges.

An incision portion (e.g., an incision or cut) may be formed at the bending portion 221. In an embodiment, an incision portion 222 in a generally half circle shape may be formed at each side of the bending portion 221 in width directional edges thereof. Therefore, the width of the bending portion 221 may become relatively narrow and then may become wider again along its length. However, a location where the incision portion is formed at the bending portion 221 should not be limited thereto. An incision portion, such as a through opening (e.g., a through opening having a circular or oval shape) may be formed at a middle portion in the width direction of the bending portion 221. The flexible substrate layer may be more easily bent due to the incision portion. However, in another embodiment, the incision portion may not be formed.

The flexible substrate layer 220 may further include first and second flat portions 227 and 226 extending from respective ends of the bending portion 221 such that they overlap each other while being spaced from (e.g., spaced apart from) each other when the flexible substrate layer 220 is bent. The first and second flat portions 227 and 226 may extend in the width direction of the unit battery. The terminal mounting surface may be disposed to face the sealing portion of the unit battery.

The anode tab 112A and the cathode tab 113A of the first unit battery may be fixed to the first flat portion 227 through the first anode coupling terminal and the first cathode coupling terminal, respectively. The first anode coupling terminal 212A and the first cathode coupling terminal 213A may be fixed to the terminal mounting surface of the first flat portion. The first anode coupling terminal 212A and the first cathode coupling terminal 213A may be fixed while being spaced from each other by about or approximately the distance which the anode tab 112A and the cathode tab 113A are spaced apart. Similarly, the anode tab 112B and the cathode tab 113B of the second unit battery may be fixed to the second flat portion 226 through the second anode coupling terminal and the second cathode coupling terminal, respectively.

The first flat portion 227 may be disposed such that the terminal mounting surface faces the sealing portion 142A of the first unit battery and an opposite surface of the terminal mounting surface of the first flat portion 227 faces the second flat portion 226. However, the rigid substrate layer is stacked on the opposite surface of the terminal mounting surface of the first flat portion 227, which will be further described below.

The second flat portion 226 may be disposed such that the terminal mounting surface faces the sealing portion 142B of the second unit battery and the opposite surface of the terminal mounting surface of the second flat portion 226 faces the first flat portion 227. However, the rigid substrate layer is stacked on the opposite surface of the terminal mounting surface of the second flat portion 226, which will be further described below.

The rigid substrate layers 230A and 230B may include a first rigid substrate layer 230A and a second rigid substrate layer 230B. The first rigid substrate layer 230A, being arranged on (e.g., stacked on) the first flat portion 227, may maintain the shape of the first flat portion flat. The second rigid substrate layer 230B, being arranged on (e.g., stacked on) the second flat portion 226, may maintain the shape of the second flat portion flat.

Figure 7:
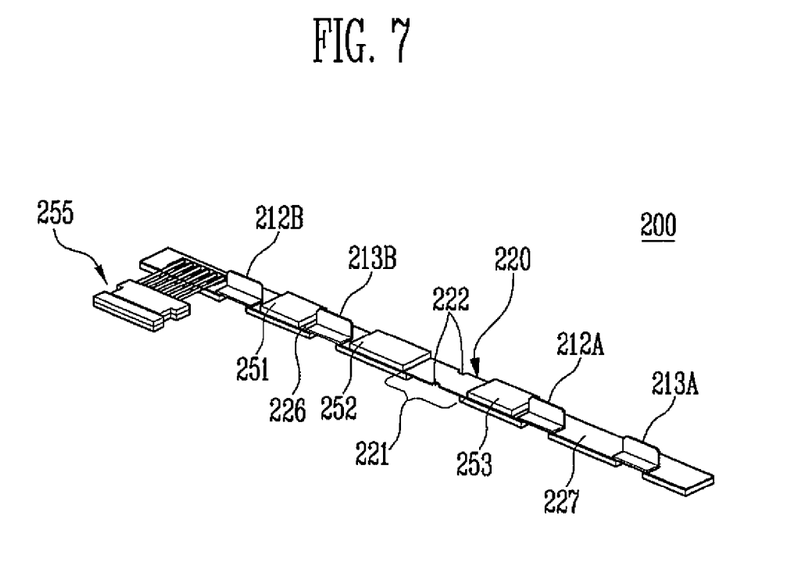
FIG. 7 is a front perspective view illustrating a circuit module before being assembled into the unit battery illustrated in FIG. 5.
Figure 8:
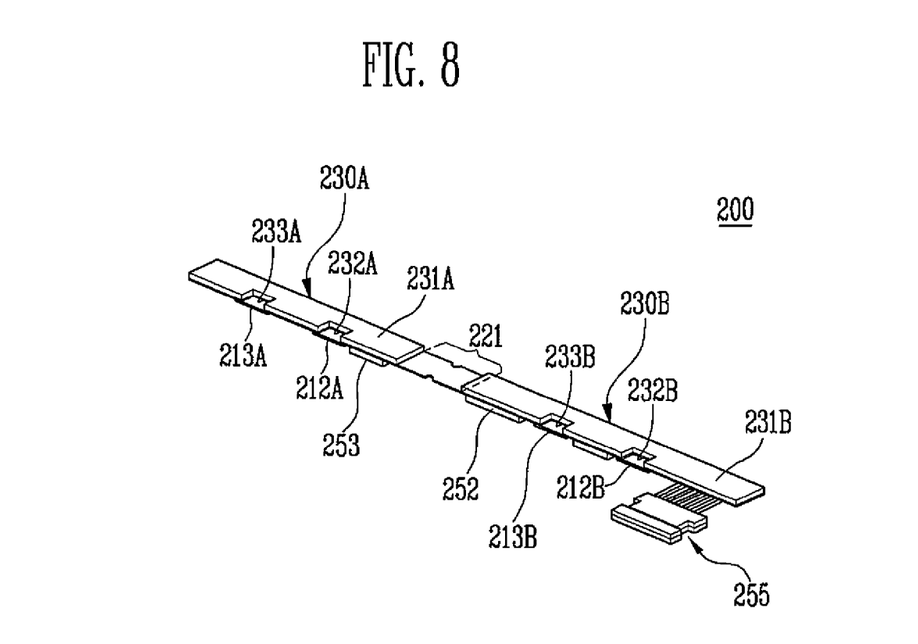
FIG. 8 is a back perspective view of the circuit module illustrated in FIG. 7.

For convenience of illustration, FIGS. 7 and 8 illustrate the control module 200 before being coupled with the plurality of unit batteries. FIG. 7 shows the terminal installation surface of the circuit board. FIG. 8 shows the opposite surface of the circuit board as that shown in FIG. 7 (e.g., the surface opposite to the terminal installation surface of the circuit board).

Referring to FIG. 7, the plurality of coupling terminals 212A, 213A, 212B, and 213B may be rib shaped and are generally bent 90 degrees (e.g., are bent about 90 degrees). The plurality of coupling terminals 212A, 213A, 212B, and 213B may be bent 90 degrees prior to the anode tab and the cathode tab of the unit battery being fixed thereto. After the anode tab and the cathode tab of the unit battery are mounted on the corresponding coupling terminals, they are further bent, generally 90 degrees (e.g., about 90 degrees), to surround ends portions of each of the anode tab and the cathode tab, thereby fixing the anode tab and the cathode tab to the respective coupling terminals. The final shape of the coupling terminals that fix the anode tab and the cathode tab of the unit battery are illustrated in FIGS. 3 and 4.

Referring to FIGS. 7 and 8, the flexible substrate layer 220 may be formed of a single substrate layer. The flexible substrate layer 220 may include the bending portion 221, which is bent in a state in which it is assembled with the unit batteries, and the first and second flat portions 227 and 226 which are flat portions in a state in which it is assembled with the unit batteries. The flexible substrate layer 220 may extend such that its length is about or approximately equal to a sum of a width of the first unit battery and a width of the second unit battery.

However, the flexible substrate layer 220 is not limited thereto, and the length of the flexible substrate layer 220 may extend for at least a length which passes each of the anode tab 112A and the cathode tab 113A of the first unit battery and the anode tab 112B and the cathode tab 113B of the second unit battery. The length which the flexible substrate layer extends may vary depending on an arrangement of a device circuit and a connector mounted on the flexible substrate layer 220. For example, but without limitation thereto, the length of the flexible substrate layer may be greater than the sum of the widths of the first and second unit batteries.

The first rigid substrate layer 230A may be formed with the same or substantially the same length as the first flat portion 227. The second rigid substrate layer 230B may be formed with the same or substantially the same length as the second flat portion 226. However, the length which the flat portions extend (e.g., the extension length of the flat portions), which correspond to the rigid substrate layers, does not have to be the same as the rigid substrate layers.

In another embodiment, the first rigid substrate layer 230A may be formed shorter than the first flat portion 227. For example, but without limitation thereto, the first rigid substrate layer 230A may be formed longer than at least a distance between the first anode tab 112A and the first cathode tab 113A of the first unit battery and shorter than the first flat portion. Similarly, the second rigid substrate layer 230B may be formed longer than at least a distance between the second anode tab 112B and the second cathode tab 113B of the second unit battery and shorter than the second flat portion 226.

The first rigid substrate layer according to another embodiment may at least partially overlap the first anode coupling terminal 212A and the first cathode coupling terminal 213A such that the coupling terminals 212A and 213A are sufficiently supported by the first rigid substrate layer. Likewise, the second rigid substrate layer according to another embodiment may at least partially overlap the second anode coupling terminal 212B and the second cathode coupling terminal 213B such that the coupling terminals 212B and 213B are sufficiently supported by the second rigid substrate layer.

The first rigid substrate layer 230A may include a first rigid base 231A. The first rigid base may be a body of (e.g., a portion or a surface of) the first rigid substrate layer. A plurality of grooves 232A and 233A respectively exposing a portion of the coupling terminals may be formed in the first rigid base 231A such that the coupling terminals may be accessible from the rigid substrate layer side.

The second rigid substrate layer 230B may include a second rigid base 231B. The second rigid base may correspond to a body of (e.g., a portion or a surface of) the second rigid substrate layer. Similar to the first rigid base, a plurality of grooves 232B and 233B may be formed in the second rigid base 231B.

The first rigid base and the second rigid base may be plates formed with a sufficient thickness to support the first flat portion and the second flat portion and to maintain them in a flat shape. Wire patterns may not be printed thereon. However, the circuit board should not be limited thereto. When the circuit board is, in another embodiment, included as a rigid flexible printed circuit board (RF PCB), there may be conductive wire included in the rigid substrate layer.

Figure 5:
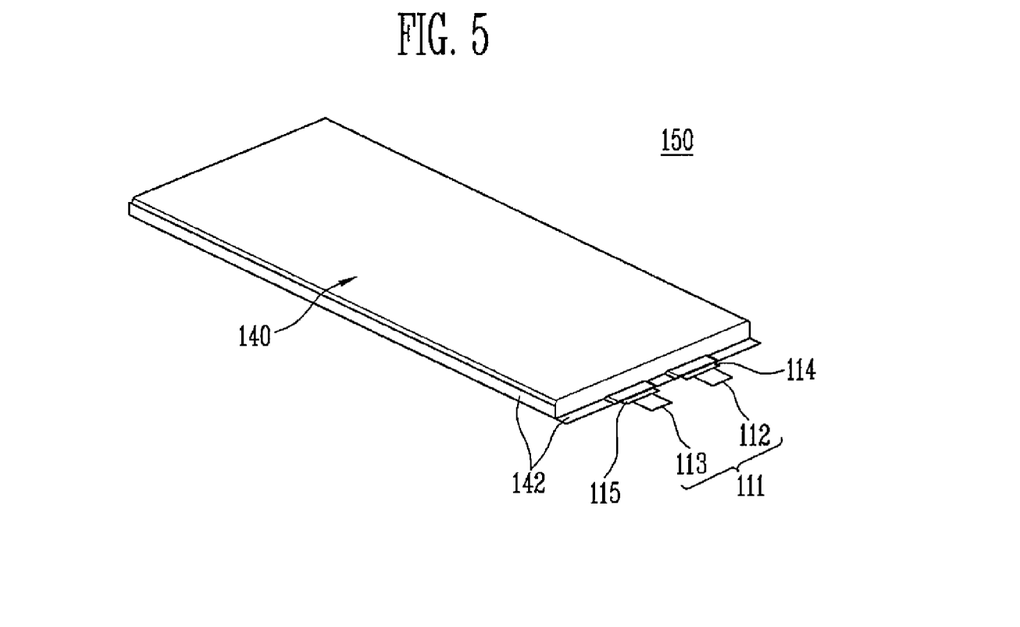
FIG. 5 is a perspective view illustrating a unit battery in the embodiment illustrated in FIG. 1.
Figure 6:
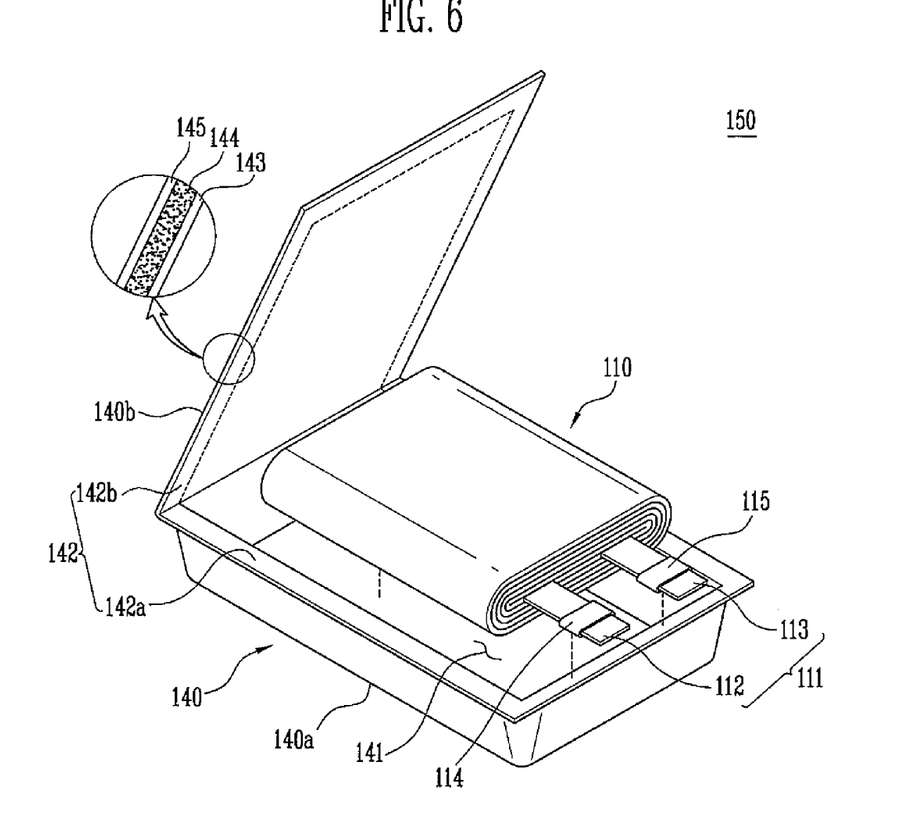
FIG. 6 is an exploded perspective view illustrating the unit battery illustrated in FIG. 5.

FIGS. 5 and 6 schematically illustrate an electrode assembly sealed in a pouch type case according to an embodiment of the present invention. The unit battery 150 may include a battery case 140 and an electrode assembly 110 sealed in the battery case along with the electrolyte.

Referring to FIG. 6, an electrode assembly 110 may be formed by an anode plate and a cathode plate being sequentially stacked and then wrapped. The anode plate may function as an anode, and the cathode plate may function as a cathode. The electrode assembly may include an electrode tab 111 extending to outside of the battery case. The electrode tab 111 may include an anode tab 112 electrically coupled to the anode and a cathode tab 113 electrically coupled to the cathode plate. The anode tab 112 and the cathode tab 113 may be reversed in position. The electrochemical energy generated from the unit battery may be transferred to outside by the electrode tab 111.

The battery case 140 may include a first portion case 140a and a second portion case 140b as members surrounding the electrode assembly 110. A receiving portion 141, which is a space for receiving the electrode assembly 110, may be formed at the first portion case 140a. The second portion case 140b may be implemented to cover the first portion case 140a. The receiving portion 141 may be configured to correspond to a shape and a size of the electrode assembly 110. For example, but without limitation thereto, the receiving portion 141 may be manufactured using a deep drawing process for making hollow vessel from a flat plate without a joint.

The unit battery 150 may be manufactured by including the electrode assembly 110 and the electrolyte in the receiving portion 141 and thermosetting an edge 142a of the first portion case 140a and an edge 142b of the second portion case 140b in a state in which the first portion case 140a and the second portion case 140b are closely adhered to each other, thereby forming the sealing portion 142. The electrode tab 111 of the electrode assembly 110 may extend to outside of the battery case through the sealing portion 142.

Referring to FIG. 6, a battery case 140 may sequentially include an inner resin layer 143, a metal layer 144, and an outer resin layer 145. The inner resin layer 143 may be a portion directly facing the electrode assembly 110. The outer resin layer 145 may be a portion corresponding to an outermost surface of the battery case 140. The inner resin layer 143 and the outer resin layer 145 may be formed of a high molecular weight resin and the like which is electrically nonconductive in order to prevent an undesired short circuit and the like. The metal layer 144 may be provided between the inner resin layer 143 and the outer resin layer 145, providing mechanical strength to the battery case 140, and may include, for example, but without limitation thereto, aluminum and the like.

A film 114 for insulation may be further included in the electrode tab 111, providing insulation between the electrode tab 111 and the battery case 140. The film 114 may be mounted in the sealing portion 142 and may be formed of an electrically nonconductive material. Therefore, short circuiting of the electrode tab 111 and the metal layer 144 may be prevented. The film 114 may be formed of similar material as the sealing portion 142, aiding the sealing portion 142 to be completely thermoset. Because the electrode tab 111 formed of metal is completely sealed with the sealing portion 142 and the film 114, a sealing strength of the battery case 140 may be strengthened. The film 114 may bend according to curvature of the electrode tab 111.

In an embodiment, a wrapped type electrode assembly being sealed in a pouch type case is described in detail with reference to FIGS. 5 and 6. However, the present invention is not limited thereto. A stack type electrode assembly may be sealed in a pouch type case. Also, a stack type or a wrapped type electrode assembly may be sealed in an angular case.

The plurality of insulating members 250 and 310 and the label 330 are described in further detail below. The plurality of insulating members may include a first insulating member 250 and a second insulating member 310 insulating the control module 200 from the surroundings.

The first insulating member 250 may be a member that insulates and surrounds the control module 200 coupled to the anode tab and the cathode tab of the unit battery. The first insulating member may be an insulating tape. The first insulating member 250 may be provided between the unit batteries 150A and 150B and the control module 200.

Referring to FIGS. 3 and 4, in the first insulating member 250, the terminal mounting surface of the control module and the first and second rigid bases 231A and 231B are stacked and covered by the first insulating member 250. The first insulating member 250 may be disposed between the sealing portion 142A of the first unit battery and the first anode and cathode coupling terminals 212A and 213A such that the coupling terminals 212A and 213A do not contact the sealing portion 142A and portions of the anode tab and the cathode tab are exposed at the sealing portion 142A. Likewise, the first insulating member may be disposed between the sealing portion 142B of the second unit battery and the second anode and cathode coupling terminals 212B and 213B such that the coupling terminals 212B and 213B do not contact the sealing portion 142B and the portions of the anode tab and the cathode tab are exposed at the sealing portion 142B.

The first insulating member 250 may surround portions of the control module 200 that abut (e.g., face) the cases of the unit batteries, thereby preventing the control module 200 from contacting the cases 140A and 140B. Referring to FIG. 4, the first insulating member 250 may be disposed between the control module 200 and the cases 140A and 140B of the unit batteries, running across and between them for complete separation. Therefore, the control module may be insulated from all portions thereof abutting the unit batteries by the first insulating member.

The second insulating member 310 may insulate the control module 200 from the external environment. Referring to FIG. 1, the second insulating member 310 may completely surround the control module 200 and may extend to cover outer surfaces of the first and second unit batteries at portions where the control module is installed. An opening (e.g., a through tube) may be formed at the second insulating member 310 to expose the connector 255 to outside of the battery pack. The connector 255 may extend to outside of the battery pack through the opening. The second insulating member 310 may be an insulating tape.

The label 330 may be a tape surrounding almost all of the outer surfaces of the first and second unit batteries, which are stacked. Serial numbers and the like may be indicated on the label 330.

Figure 9:
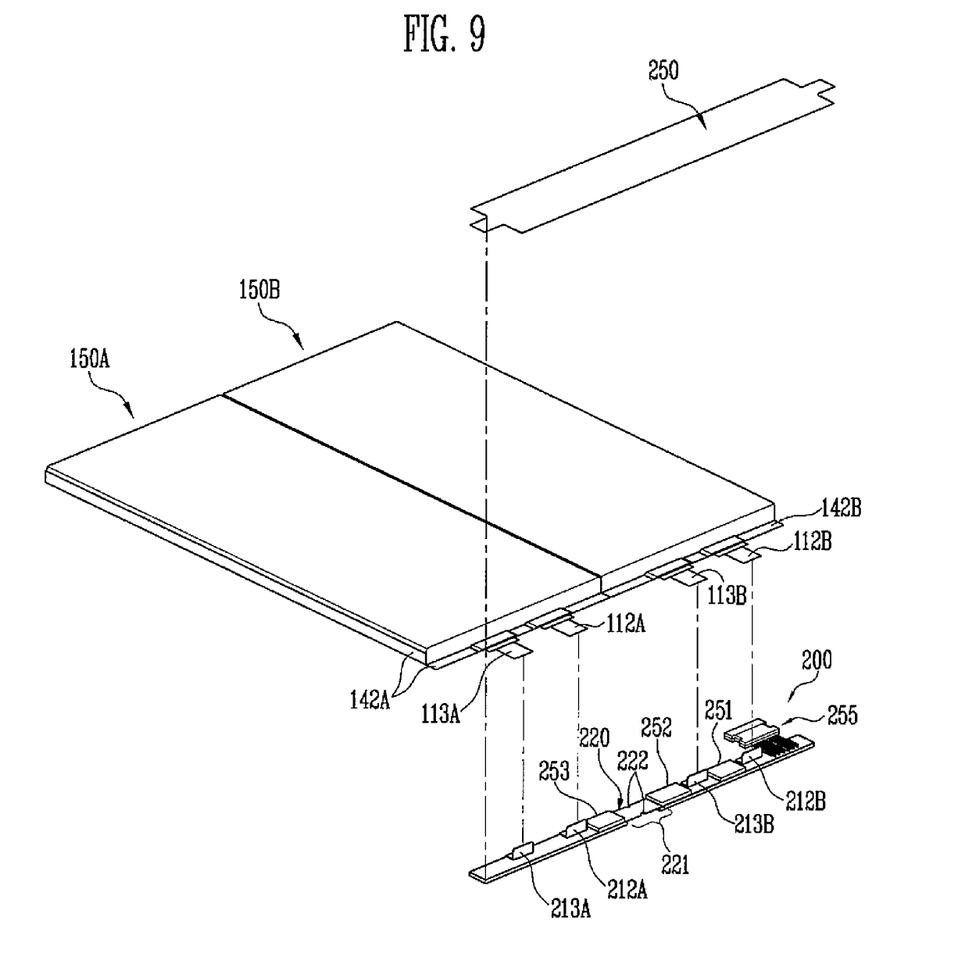
FIG. 9 is an exploded perspective view illustrating a step of a manufacturing process of a battery pack according to an embodiment of the present invention in which a first unit battery and a second unit battery are assembled with a control module and a first insulating member.

Hereinafter, an embodiment of a method of manufacturing the battery pack according to an embodiment of the present invention is described with reference to FIGS. 1 to 11. Referring to FIG. 9, the first and second unit batteries 150A and 150B may be aligned with each other such that the electrode tabs are arranged in the same direction, and the control module 200 may be coupled to the unit batteries in a state in which the control module 200 is stretched out (e.g., unfolded).

When the anode and cathode tabs 112A, 112B, 113A, and 113B of the unit batteries corresponding to the plurality of coupling terminals 212A, 212B, 213A, and 213B are arranged on respective ones of the plurality of coupling terminals, the coupling terminals may be bent almost 90 degrees towards the respective electrode tabs. The coupling terminals and the electrode tabs may be firmly fixed to each other by resistance welding and/or the like.

Figure 10:
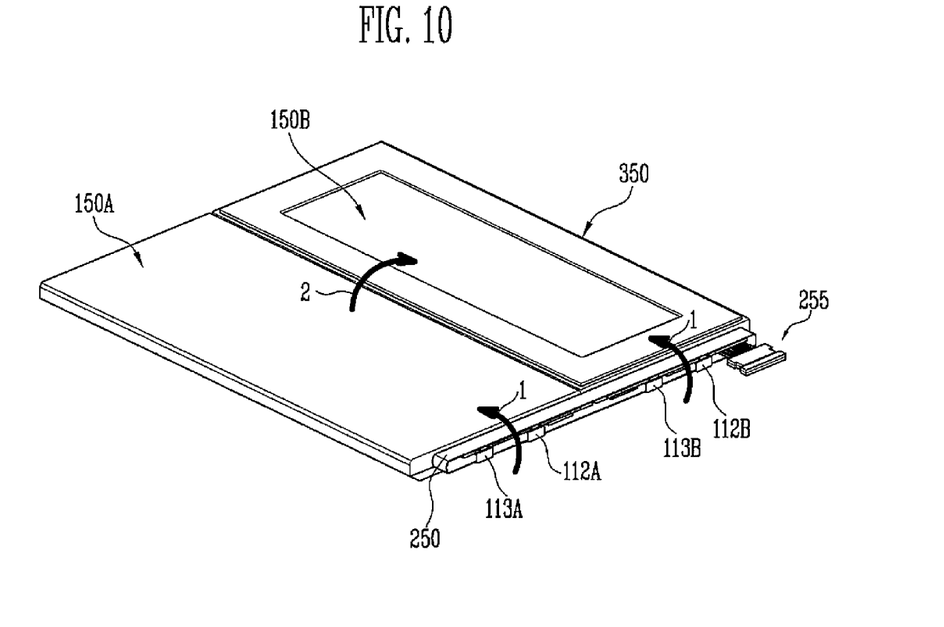
FIG. 10 is a perspective view illustrating a step of a manufacturing process of a battery pack according to an embodiment of the present invention, illustrating a stack arrangement of the first and second unit batteries.

Referring to FIG. 9, after the electrode tabs are fixed to respective ones of the plurality of coupling terminals, the first insulating member 250 may surround the terminal mounting surface of the control module 200, the surface where the rigid substrate layer is stacked, and the anode end portion. Referring to FIG. 10, the control module 200 attached to the first insulating member may be folded 180 degrees towards the unit battery in a direction of arrow number 1 and may be disposed to overlap the sealing portion 142A of the first unit battery and the sealing portion 142B of the second unit battery. The control module shown in FIG. 10 represents a state in which the control module is folded in the direction of arrow number 1. Thereafter, the first unit battery 150A is rotated 180 degrees towards the second unit battery 150B in a direction of arrow number 2 and is stacked on the second unit battery.

Figure 11:
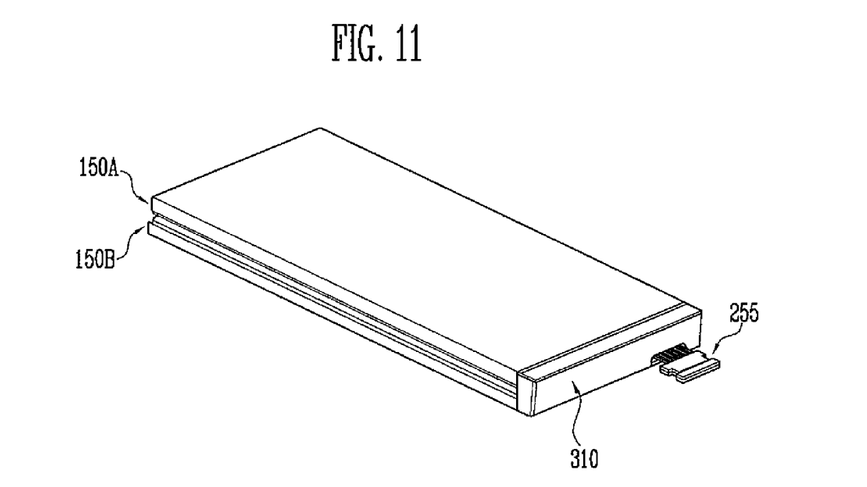
FIG. 11 is a perspective view illustrating a step of a manufacturing process of a battery pack according to an embodiment of the present invention illustrating an assembled shape in which a second insulating member is assembled to the stacked first and second unit batteries.

As shown in FIG. 10, the adhesive layer 350 may be formed on the second unit battery 150B but is not limited thereto. After the first unit battery and the second unit battery are stacked after being rotated in the direction of arrow number 2, the second insulating member 310 may completely surround the portion where the control module 200 is installed as shown in FIG. 11.

Thereafter, as shown in FIG. 1, the label 330 may surround the stacked unit batteries as shown in FIG. 1. Accordingly, a battery pack according to an embodiment of the present invention may be manufactured.

Example embodiments of the present invention have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims and their equivalents.

What is claimed is:

1. A battery pack comprising:
a plurality of unit batteries stacked on each other; and
a circuit board electrically coupled to the plurality of unit batteries and being bent, the circuit board comprising:
a first substrate comprising a bent portion; and
a second substrate on the first substrate and being less flexible than the first substrate.

2. The battery pack as claimed in claim 1, further comprising a plurality of circuit devices on the circuit board and electrically coupled to the plurality of unit batteries.

3. The battery pack as claimed in claim 2, wherein at least one of the plurality of circuit devices is configured to prevent overcharge or overdischarge of the plurality of unit batteries.

4. The battery pack as claimed in claim 2, wherein the plurality of circuit devices are on a surface of the first substrate opposite to a surface on which the second substrate is arranged.

5. The battery pack as claimed in claim 1, further comprising a plurality of coupling terminals on the first substrate and electrically coupled to the plurality of unit batteries,
wherein the plurality of coupling terminals are on a surface of the first substrate opposite to a surface on which the second substrate is arranged.

6. The battery pack as claimed in claim 5, wherein each of the plurality of unit batteries comprises a case, a cathode tab, and an anode tab,
wherein the cathode tab extends to outside of the case and is coupled to one of the plurality of coupling terminals, and
wherein the anode tab extends to the outside of the case and is coupled to another one of the plurality of coupling terminals.

7. The battery pack as claimed in claim 5, wherein grooves are at overlapping portions of the first substrate and the second substrate where the plurality of coupling terminals are arranged such that the plurality of coupling terminals are exposed through the second substrate.

8. The battery pack as claimed in claim 1, wherein each of the plurality of unit batteries comprises a case, an anode tab, and a cathode tab, the anode tab and the cathode tab both extending to outside of the case and coupled to the circuit board, and
wherein the second substrate has a length that is greater than a distance between the anode tab and the cathode tab of one of the plurality of unit batteries and less than or the same as a sum of widths of the plurality of unit batteries.

9. The battery pack as claimed in claim 8, wherein the second substrate extends in a direction crossing a direction in which the anode tab and the cathode tab extend.

10. The battery pack as claimed in claim 1, wherein the bent portion comprises a portion that has a width that is less than an adjacent portion of the bent portion.

11. The battery pack as claimed in claim 1, wherein the plurality of unit batteries comprises first and second unit batteries and each of the first and second unit batteries comprises an anode tab and a cathode tab, and
wherein the first substrate has first and second flat portions respectively extending from ends of the bent portion and overlapping each other.

12. The battery pack as claimed in claim 11, wherein the second substrate comprises a first rigid base on the first flat portion and a second rigid base on the second flat portion.

13. The battery pack as claimed in claim 12, wherein the first rigid base extends in a same direction as that of the first flat portion, and
wherein the second rigid base extends in a same direction that as that of the second flat portion.

14. The battery pack as claimed in claim 13, wherein the first rigid base has a length that is greater than a distance between the anode tab and the cathode tab of the first unit battery and less than or the same as a width of the first unit battery, and wherein the second rigid base has a length that is greater than a distance between the anode tab and the cathode tab of the second unit battery and less than or the same as a width of the second unit battery.

15. The battery pack as claimed in claim 12, wherein the first rigid base and the second rigid base are separate from each other.

16. The battery pack as claimed in claim 1, wherein the plurality of unit batteries are stacked on each other in a first direction,
   wherein each of the plurality of unit batteries comprises a case, a cathode tab, and an anode tab, the cathode and anode tabs extending from the case in a second direction crossing the first direction, and
   wherein the bent portion is curved about the second direction as an axis.

17. The battery pack as claimed in claim 12, further comprising a plurality of coupling terminals on a first surface of the first substrate and electrically coupled to the plurality of unit batteries, the first surface of the first substrate being an outer surface of the first substrate,
   wherein the first rigid base and the second rigid base are on a second side of the first substrate, the second side of the first substrate being an inner surface of the first substrate.

* * * * *